(12) United States Patent
Kuan et al.

(10) Patent No.: US 9,411,445 B2
(45) Date of Patent: Aug. 9, 2016

(54) INPUT OBJECT CLASSIFICATION

(71) Applicant: Synaptics Incorporated, San Jose, CA (US)

(72) Inventors: Chia-yun Kuan, Sunnyvale, CA (US); Shwetank Kumar, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 228 days.

(21) Appl. No.: 13/929,514

(22) Filed: Jun. 27, 2013

(65) Prior Publication Data

US 2015/0002405 A1 Jan. 1, 2015

(51) Int. Cl.
| | |
|---|---|
| *G06F 3/041* | (2006.01) |
| *G06F 3/044* | (2006.01) |
| *G06K 9/00* | (2006.01) |
| *G06K 9/62* | (2006.01) |

(52) U.S. Cl.
CPC ............. *G06F 3/041* (2013.01); *G06F 3/044* (2013.01); *G06K 9/0002* (2013.01); *G06K 9/6278* (2013.01); *G06F 2203/04101* (2013.01)

(58) Field of Classification Search
CPC .................. G06F 3/0416; G06F 3/044; G06F 2203/04101; G06F 2203/04104; G06F 3/0488; G06F 3/041; G06K 9/00375
USPC .................................... 345/173–178; 324/679
See application file for complete search history.

(56) References Cited

U.S. PATENT DOCUMENTS

| | | | |
|---|---|---|---|
| 3,846,755 A | 11/1974 | Hart | |
| 4,782,328 A | 11/1988 | Denlinger | |
| 4,783,829 A | 11/1988 | Miyakawa et al. | |
| 5,335,298 A | 8/1994 | Hevenor et al. | |
| 5,485,568 A | 1/1996 | Venable et al. | |
| 5,892,854 A | 4/1999 | de Queiroz et al. | |
| 5,969,339 A | 10/1999 | McMurray et al. | |
| 6,201,888 B1 | 3/2001 | Kalvin | |
| 6,392,686 B1 | 5/2002 | Kao et al. | |
| 7,440,588 B2 | 10/2008 | Kaneko et al. | |
| 7,526,140 B2 | 4/2009 | Fang et al. | |
| 7,812,828 B2 | 10/2010 | Westerman et al. | |
| 7,835,568 B2 | 11/2010 | Park et al. | |
| 9,081,450 B1* | 7/2015 | Mohindra | G06F 3/044 |
| 2004/0249584 A1 | 12/2004 | Gibb et al. | |
| 2005/0226505 A1* | 10/2005 | Wilson | 382/180 |
| 2006/0222221 A1 | 10/2006 | Sathyanarayana | |

(Continued)

OTHER PUBLICATIONS

International Search Report and Written Opinion in corresponding International Application No. PCT/US2014/038986, mailed Sep. 24, 2014 (14 pages).

*Primary Examiner* — Alexander Eisen
*Assistant Examiner* — Abhishek Sarma
(74) *Attorney, Agent, or Firm* — Osha Liang LLP (57) ABSTRACT

A processing system for an input device includes a sensor module and a determination module. The sensor module includes sensor circuitry coupled to transmitter electrodes and receiver electrodes. The sensor module is configured to transmit transmitter signals with the transmitter electrode and receive resulting signals with the receiver electrodes. The determination module is configured to obtain a set of measurements for an input object detected in a sensing region of the input device from a capacitive image, and perform, based on the set of measurements, a multistage classification to obtain a classification result identifying a type of the input object. wherein the capacitive image is generated based on the resulting signals.

20 Claims, 6 Drawing Sheets

(56) References Cited

U.S. PATENT DOCUMENTS

| | | |
|---|---|---|
| 2006/0238522 A1 | 10/2006 | Westerman et al. |
| 2007/0248268 A1 | 10/2007 | Wood |
| 2008/0012835 A1* | 1/2008 | Rimon et al. ............... 345/173 |
| 2008/0158185 A1* | 7/2008 | Westerman ............... 345/173 |
| 2008/0158193 A1 | 7/2008 | Lapstun et al. |
| 2008/0240494 A1 | 10/2008 | Oosawa et al. |
| 2008/0252615 A1 | 10/2008 | Shipton |
| 2008/0284750 A1 | 11/2008 | Hsu et al. |
| 2009/0021489 A1 | 1/2009 | Westerman et al. |
| 2009/0095540 A1* | 4/2009 | Zachut et al. ............ 178/18.03 |
| 2009/0300531 A1 | 12/2009 | Pryor |
| 2010/0127995 A1 | 5/2010 | Rigazio et al. |
| 2010/0189320 A1 | 7/2010 | Dewaele |
| 2011/0057670 A1* | 3/2011 | Jordan ............... 324/679 |
| 2012/0007821 A1 | 1/2012 | Zaliva |
| 2012/0158629 A1 | 6/2012 | Hinckley et al. |
| 2012/0162057 A1 | 6/2012 | Tan et al. |
| 2012/0262407 A1* | 10/2012 | Hinckley et al. ............ 345/173 |
| 2013/0050131 A1 | 2/2013 | Lee et al. |
| 2013/0300696 A1* | 11/2013 | Haran et al. ............... 345/173 |
| 2014/0104194 A1* | 4/2014 | Davidson et al. ............ 345/173 |

* cited by examiner

INPUT OBJECT CLASSIFICATION

FIELD OF THE INVENTION

The invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for an input device. The processing system includes a sensor module and a determination module. The sensor module includes sensor circuitry coupled to transmitter electrodes and receiver electrodes. The sensor module is configured to transmit transmitter signals with the transmitter electrode and receive resulting signals with the receiver electrodes. The determination module is configured to obtain a set of measurements for an input object detected in a sensing region of the input device from a capacitive image, and perform, based on the set of measurements, a multistage classification to obtain a classification result identifying a type of the input object. wherein the capacitive image is generated based on the resulting signals.

In general, in one aspect, embodiments relate to a method for classifying a type of input object. The method includes obtaining a set of measurements for an input object detected in a sensing region of the input device from a capacitive image. The capacitive image is generated based on resulting signals obtained by a sensor module. The method further includes performing, based on the set of measurements, a multistage classification to obtain a classification result identifying a type of the input object.

In general, in one aspect, embodiments relate to an input device that includes transmitter electrodes, receiver electrodes, and a processing system. The transmitter electrodes are configured to transmit transmitter signals. The receiver electrodes are configured to receive resulting signals from the plurality of transmitter signals. The processing system is configured to obtain a set of measurements for an input object detected in a sensing region of the input device from a capacitive image, and perform, based on the set of measurements, a multistage classification to obtain a classification result identifying a type of the input object. The capacitive image is generated based on the resulting signals.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Various embodiments of the present invention provide input devices and methods that facilitate improved usability. In general, one or more embodiments of the invention provide a method and apparatus for determining a type of an input object. Specifically, one or more embodiments of the invention obtain a set of measurements for the input object detected in a sensing region of an input device from a capacitive image, and perform a multistage classification based on the set of measurements.

Figure 1:
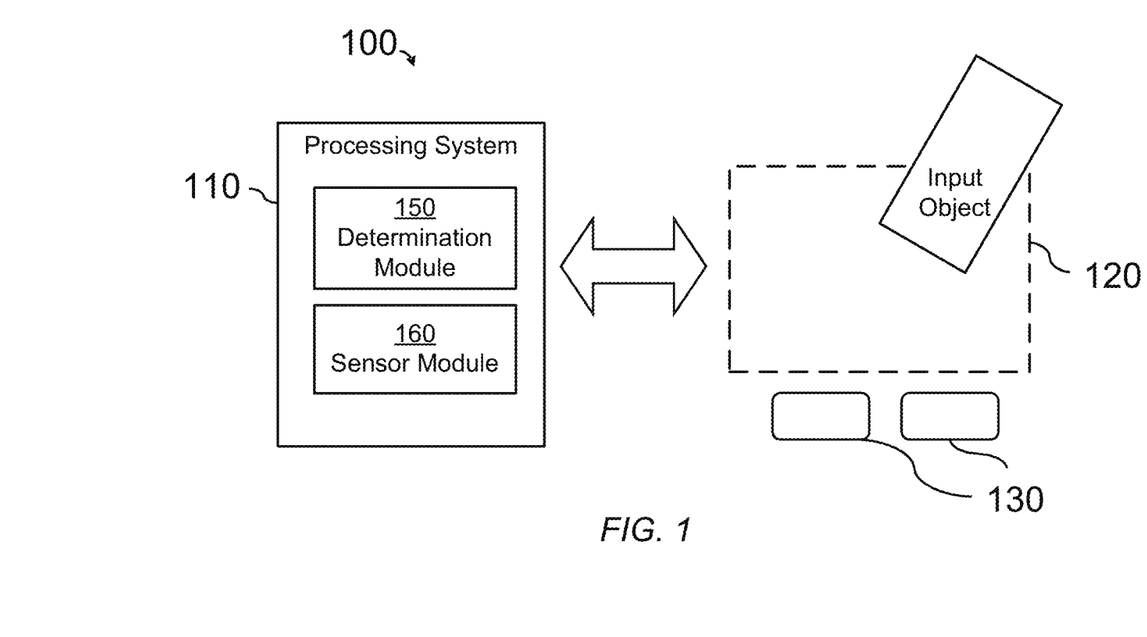
FIG. 1 is a block diagram of an exemplary system that includes an input object in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad", "touch screen", or a "touch sensor device") configured to sense input provided by one or more input objects (140) in a sensing region (120). Example input objects include pointer instruments, fingers, palms, hovering palms, and other objects that may be in the sensing region. A pointer instrument is a hardware device for interacting with the input device. For example, the pointer instrument may be a pen, a stylus, or other such device.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110)

are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device 100. In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, determine a type of input object, perform other determinations, or a combination thereof.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as GUI actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2A:
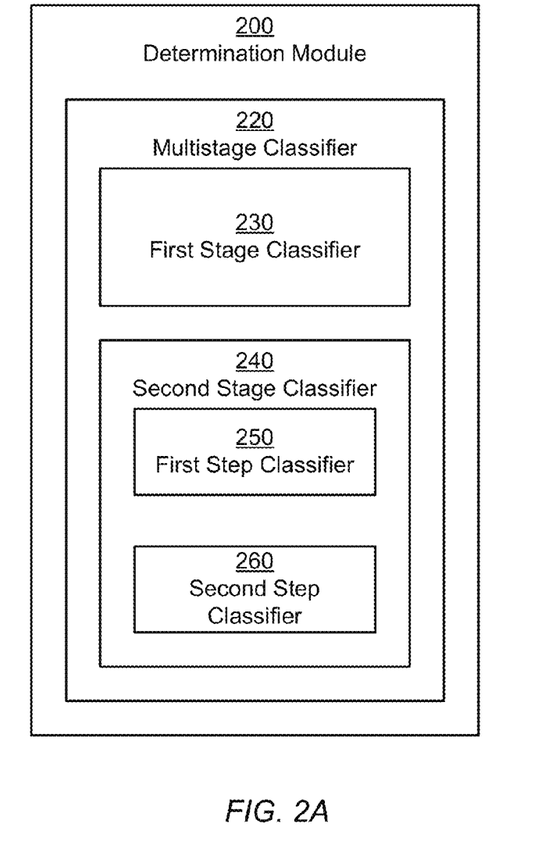
FIG. 2A is a block diagram of an exemplary system that includes a determination module in accordance with one or more embodiments of the invention.

FIG. 2A shows a schematic diagram of an embodiment of determination module (200) in accordance with one or more embodiments of the invention. The determination module (200) includes functionality to detect when an input object in the sensing region. For example, the determination module may detect the input object when the input object is in physical contact with the surface of the sensing region and/or when the input object is within a threshold distance to the surface of the sensing region. In one or more embodiments of the invention, the determination module (200) may further include functionality to generate positional information describing the input object in the sensing region. As shown in FIG. 2, the determination module (200) includes a multistage classifier (220).

Figure 2B:
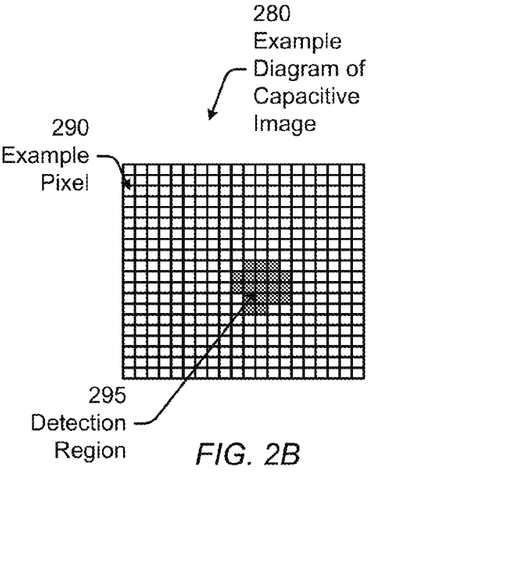
FIG. 2B shows an example diagram of a capacitive image in accordance with one or more embodiments of the invention.

The multistage classifier (220) may be hardware, software, or a combination thereof. In one or more embodiments of the invention, a multistage classifier (220) is logic that includes multiple stages to identify a type of the input object based on a set of measurements obtained from a capacitive image. Turning briefly to FIG. 2B, FIG. 2B shows an example diagram of a capacitive image in accordance with one or more embodiments of the invention. The size and shape of the capacitive image may be different than that shown in FIG. 2B without departing from the scope of the invention.

In one or more embodiments of the invention, the capacitive image is an image of the capacitance detected in the sensing surface. In one or more embodiments of the invention, the size and shape of the capacitive image matches the sensing surface. As shown in FIG. 2B, the capacitive image may be partitioned into pixels (shown as a small boxes in FIG. 2B). For example, example pixel (290) is in the first column and third row of the capacitive image. Each pixel has a value reflecting a magnitude of capacitance at the corresponding portion of the sensing surface. For example, if the input object is touching the area of the sensing surface corresponding to at least example pixel (290) in the capacitive image, the value of example pixel (290) in the capacitive image may be greater than or less than if the input object was not present in the sensing region.

In one or more embodiments of the invention, the group of pixels whose values are modified by the presence of the input object may be referred to as a detection region. For example, consider the scenario in which the input object is over the sensing surface corresponding to the grey pixels of the example diagram of the capacitive image (280). In other words, each grey pixel has a value that is affected by the presence of the input object. In the example, the grey pixels form the detection region (295) in accordance with one or more embodiments of the invention.

Returning to FIG. 2A, the set of measurements may include calculated measurements and statistics describing the impact of the input object in the detection region. For example, the set of measurements may include area of the detection region, a slope statistic describing a slope of the detection region, a pixel value statistic describing values of pixels of the detection region, and other properties of the detection region. In one embodiment, the slope is a difference in value between adjacent pixels. In other embodiments, the slope is a different in value between any two pixels. The slope statistic may be the maximum slope in the detection region, the average slope in the detection region, or another statistic about the slope in the detection region. The pixel value statistic may be the maximum pixel value of pixels in the detection region, the average pixel value of pixels in the detection region, or another statistic about the pixel values in the detection region.

Continuing with FIG. 2A, the multistage classifier (220) may include functionality to determine the type of the input object from multiple possible types. The type of the input object specifies what the input object is. For example, the type of input object may be a finger, a pointer instrument, palm, hovering palm, or variety of input object. In one or more embodiments of the invention, the multistage classifier includes a first stage classifier (230) and a second stage classifier (240).

The first stage classifier (230) may include functionality to use a subset of the set measurements to obtain a first output. For example, the first output may be a first level classification of the input object. Specifically, the first output may be a preliminary estimate of the type of the input object based on the subset of measurements and/or a confidence level. In one or more embodiments of the invention, the first stage classifier (230) may be a Bayesian classifier.

In one or more embodiments of the invention, the second stage classifier (240) includes functionality to use a subset of measurements to obtain a second output. The second output may include revised determination of the type of input object and/or a confidence level. The subset of measurements used by the second stage classifier (240) may be different from the subset of measurements used by the first stage classifier (230). In one or more embodiments of the invention, the second stage classifier (230) includes a first step classifier (250) and a second step classifier (260).

In one or more embodiments of the invention, the first step classifier (250) includes functionality to distinguish between subsets of types of input objects. For example, if the first output identifies preliminarily that the input object is a type in a first subset of types, the first stage classifier includes functionality to classify the input object among the types specified in the first subset of types. Continuing with the example, if the first output identifies preliminarily that the input object is a type in a second subset of types, then the first stage classifier includes functionality to classify the input object among the types specified in the second subset of types, which are different from the first subset of types. Any number of subsets of types may exist without departing from the scope of the invention. In one or more embodiments of the invention, the first step classifier (250) is a Bayesian classifier.

In one or more embodiments of the invention, the second step classifier (260) includes functionality to confirm or revise the type of input object classified by the first step classifier (260). In one or more embodiments of the invention, the second step classifier (260) is configured to execute when the second output is a particular type or subset of types. In one non-limiting example, the second step classifier (260) may be configured to execute only when the first step classifier (250) indicates that the input object is a finger. In one or more embodiments of the invention, the second step classifier (260) is Bayesian classifier that uses a fisher linear discriminant.

Although FIG. 2A shows the multistage classifier (220) as having two stage classifiers and two step classifiers, the multistage classifier (220) may include more than two stages and any number of steps without departing from the scope of the invention. Further, while FIGS. 1, 2A, and 2B show a particular configuration of components, other configurations may be used without departing from the scope of the invention. For example, various components may be combined to create a single component. As another example, the functionality performed by a single component may be performed by two or more components.

FIGS. 3A, 3B, 3C, 4, and 5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, decision steps may not require a processor to process an instruction unless an interrupt is received to signify that condition exists in accordance with one or more embodiments of the invention. As another example, decision steps may be performed by performing a test, such as checking a data value to test whether the value is consistent with the tested condition in accordance with one or more embodiments of the invention.

Figure 3A:
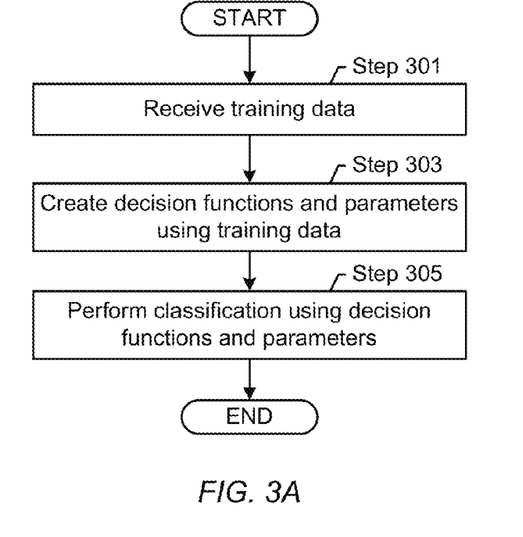
FIGS. 3A, 3B, 3C, 4, and 5 show flowcharts in accordance with one or more embodiments of the invention.

FIG. 3A shows a flowchart for training the multistage classifier in accordance with one or more embodiments of the invention. In Step 301, training data is received in accordance with one or more embodiments of the invention. In one or more embodiments of the invention, capacitance images for input objects of known types are obtained. For example, known input objects may be added to the sensing region and capacitance image may be obtained from the known input objects. Further, a set of measurements may be determined from the capacitance image. In one or more embodiments of the invention, determining the set of measurements may be performed as discussed below with reference to FIG. 4. Determining the set of measurements may be obtaining the set of measurements from another module or device without departing from the scope of the invention.

In Step 303, decision functions and parameters are determined using the training data in accordance with one or more embodiments of the invention. The decision function distinguishes between types of input objects. Determining the decision functions and parameters may be performed on a per classifier basis. Specifically, a subset of measurements is selected for the classifier. Additionally, training data corresponding to the types of input objects that are classified by the classifier are identified. For example, if the classifier distinguishes between pointer instrument, finger, palm, and hovering palm, then training data for a pointer instrument, finger, palm, or hovering palm being in the sensing region is used in Step 303 to determine decision functions and parameters for the classifier. By way of another example, if the classifier only distinguishes between a pointer instrument and finger, then only training data for a pointer instrument or finger being in the sensing region is used in Step 303 to determine decision functions and parameters for the classifier. An actual input object of the particular type may be used for the training data for the particular type. For example, a finger may be placed in the sensing region in order to obtain training data for the finger. Alternatively or additionally, input objects that approximate the particular type, such as conductive objects or slugs, may be used for training. For example, a conductive slug that has dimensions and properties which approximate a finger may be placed in the sensing region to obtain training data for a finger.

For example, the first stage classifier may be a bivariate Bayes classifier that uses a decision function of the form: $f(x) = ax_1^2 + bx_1x_2 + cx_2^2 + dx_1 + ex_2 + f$, where x is a subset of the set of measurements (e.g., $x_1$ is a first measurement in the set of measurements and $x_2$ is a second measurement in the set of measurements), a, b, c, d, e, and f are parameters calculated using the training data and f(x) is a result of the decision function. In the example, during training, a, b, c, d, e, and f are selected that for a given x in the training data, the correct type is selected. In one or more embodiments of the invention, an individual decision function (f(x)) is calculated for each possible type of input object. In particular, a decision function and parameters for a first type of input object may be defined using only training data for the first type of input object. Similarly, a decision function and parameters for a second type of input object may be defined using only training data for the second type of input object, and so forth.

By way of another example, the second stage first step classifier may use an unvariate Bayes classifier that uses a decision function of the form: $f(x) = ax_1^2 + dx_1 + f$, where x is a subset of measurements having a single measurement, a, d, and f are parameters, and f(x) is a classification result. In the example, during training, a, d, and f are selected that for a given x in the training data, the correct type is selected. Similar to the previous example, in one or more embodiments of the invention, an individual decision function (f(x)) is calculated for each possible type of input object.

By way of another example, the second stage second step classifier may be a univariate Bayes classifier that uses a fisher linear discriminant. In the example, the subset of the set of measurements is projected onto vector w to obtain scalars y, where $y = w^t x$.

$$\tilde{s}_i^2 = \sum_{y \in \text{type } i} (y - \tilde{m}_i)^2$$

is defined whereby $\tilde{m}_i$ is the mean of class i for y. A vector w is selected that maximizes $$j(w) = \frac{|\tilde{m}_1 - \tilde{m}_2|^2}{\tilde{s}_1^2 + \tilde{s}_2^2}.$$

In other words, the vector w is selected to increase the difference between the mean of the training data for the two classes and minimize the scatter of training data within each class. The Fisher linear discriminant is a scalar calculated by multiplying the vector w by the vector of the subset of measurements. Using the fisher linear discriminant for $x_1$, the decision function of the form $f(x)=ax_1^2+dx_1+f$, where a, d, and f, are parameters, is obtained. In the example, during training, a, d, and f are selected that for a given fisher linear discriminant calculated from the training data, the correct type is selected. Similar to the previous examples, in one or more embodiments of the invention, an individual decision function (f(x)) is calculated for each possible type of input object.

The above are only a few examples of the decision functions and parameters that may be calculated and used. Other decision functions and parameters may be used without departing from the invention. Further, the above is only a few examples of the classifiers. Other classifiers may be used without departing from the scope of the invention.

In Step 305, a classification is performed using the decision functions and parameters in accordance with one or more embodiments of the invention. In particular, a multistage classification may be performed when new input objects of an unknown type are detected in the sensing region. A classification may be performed as discussed below and in FIG. 3B.

In one or more embodiments of the invention, preliminary determinations may be performed prior to any decision function classification. For example, if the input object is detected at the corner or edge of the sensing region, the input object may be identified as a palm. By way of another example, the aspect ratio may be calculated and used to determine if the input object is a part of a palm. In one or more embodiments of the invention, the aspect ratio is the numerator divided by a denominator, whereby the numerator is the maximum of width and length and the denominator is the minimum of width and length, where width is the width of the detection region and length is the length of the detection region. If the aspect ratio is greater than a threshold, then the input object may be identified as a palm. In other words, the shape may be considered too narrow for a finger. In such a scenario, further classification may or may not be performed.

Figure 3B:
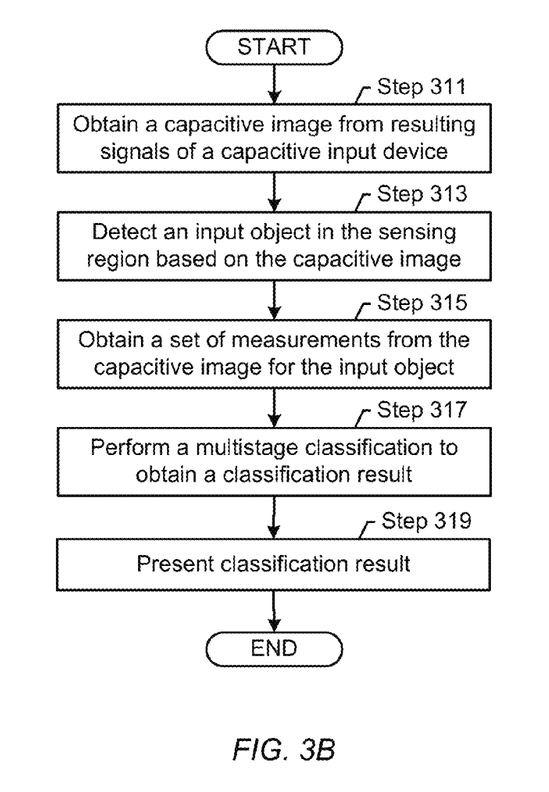

FIG. 3B shows a flowchart for determining a type of input object in accordance with one or more embodiments of the invention. In Step 311, a capacitive image is obtained from resulting signals of a capacitive input device. In one or more embodiments of the invention, transmitter electrodes may transmit transmitter signals. The receiver electrodes may receive resulting signals that result comprise effects corresponding to the transmitter signals. From the resulting signals, a capacitive image is obtained.

In Step 313, an input object is detected in the sensing region based on the capacitive image. Segmentation may be performed to isolate the input object from other input objects, if exists. Further, the capacitive image may be adjusted according to a baseline to account for interference.

In Step 315, a set of measurements are obtained from the capacitive image for the input object. Obtaining the set of measurements may be performed, for example, as discussed below and in FIG. 4.

In Step 317, a multistage classification is performed to obtain a classification result in accordance with one or more embodiments of the invention. In one or more embodiments of the invention, the multistage classification is performed as discussed below and in FIG. 3C.

In Step 319, the classification result is presented in accordance with one or more embodiments of the invention. Specifically, the classification result may be transmitted to another component or device in accordance with one or more embodiments of the invention. In one or more embodiments of the invention, the classification result may be directly or indirectly used to present output to the user. In one or more embodiments of the invention, one or more actions are performed based on the classification result. For example, if the classification result indicates that the input object is a palm with a high confidence level, the input object may be ignored because the input object is most likely an inadvertent input by a user in the sensing region. By way of another example, if the input object is a pointer instrument, the host may respond faster to the user because a greater confidence may be given to the positional information of the input object.

Figure 3C:
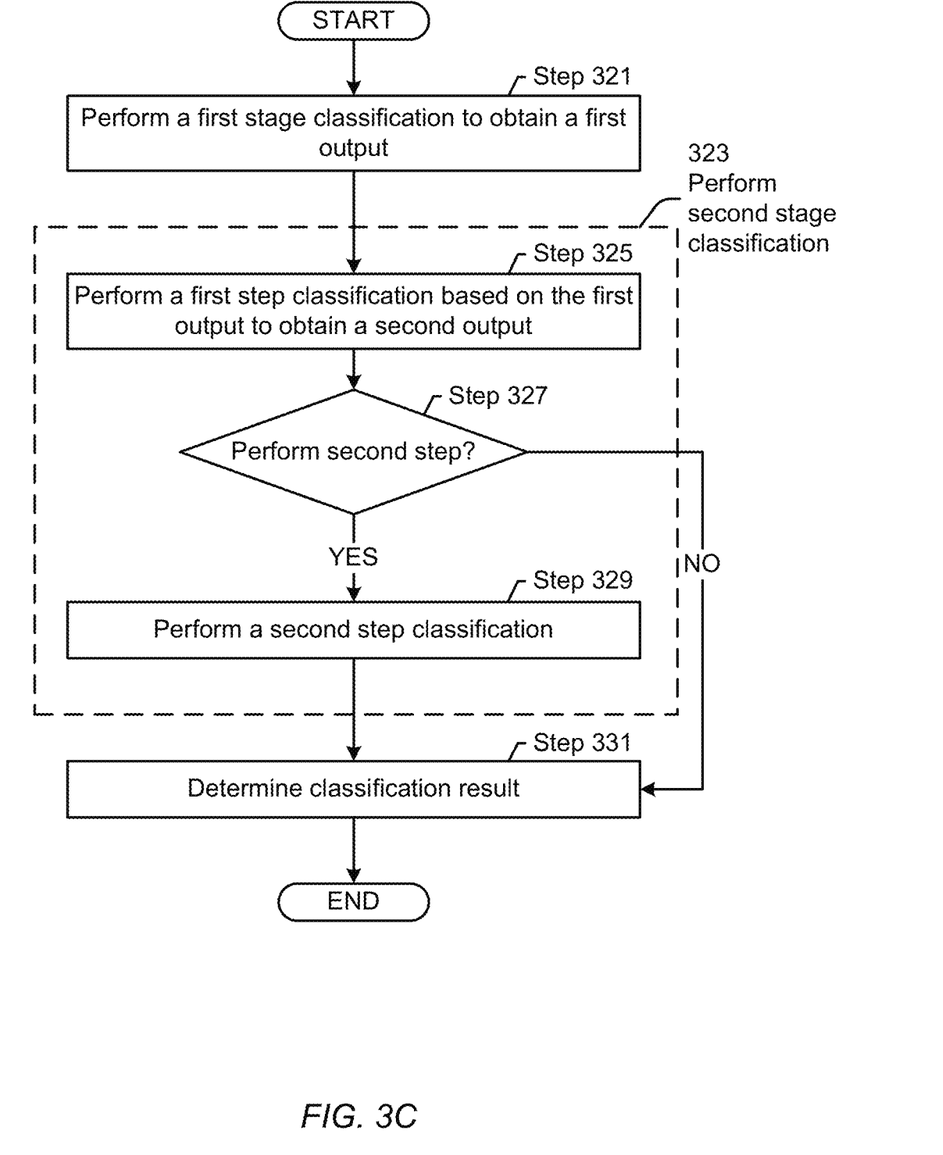

FIG. 3C show a flowchart for performing a multistage classification in accordance with one or more embodiments of the invention. In Step 321, a first stage classification is performed to obtain a first output. In one or more embodiments of the invention, the first stage classification is performed using a first subset of the set of measurements. Specifically, the first stage performs a preliminary classification using the first subset of measurements. For example, the preliminary classification performs an initial classification of the input object into a particular type from all possible types. By way of another example, the preliminary classification may identify a subset of types in which the input object is a member.

The first stage classification may be performed by calculating the results of the decision functions defined during the first stage classifier using the subset of measurements as input. In one or more embodiments of the invention, each decision function of the first stage classifier is defined for a particular type. The type associated with the decision function having the greatest resulting value for the subset of measurements of the input object is the type associated with the input object during the first stage classification. For example, the decision functions may be the decision functions discussed above with reference to Step 303 of FIG. 3A.

In Step 323, a second stage classification is performed to obtain a classification result in accordance with one or more embodiments of the invention. The second stage classification may include multiple steps. In Step 325, a first step classification is performed based on the first output to obtain a second output. Specifically, the first step classifier may identify the subset of types of the type in the first output. If the first output indicates that the type of input object is a member of a first subset of types, then the first step classifier may only consider and classify the input object into a type that is only in the first subset of types. Similarly, if the first output indicates that the type of input object is a member of a second subset of types, then the first step classifier may only consider and classify the input object into a type that is only in the second subset of types, and ignore types in the first subset of types.

In one or more embodiments of the invention, the second stage, first step classification may be performed by calculating the results of the decision functions defined during the first step classifier using a subset of measurements as input. In one or more embodiments of the invention, each decision function of the first step classifier is defined for a particular type. The type associated with the decision function having the greatest resulting value for the subset of measurements of the input object is the type associated with the input object during the second stage, first step classification. For example, the decision functions may be the decision functions discussed above with reference to Step 303 of FIG. 3A.

In Step 327, a determination is made whether to perform the second step classification in accordance with one or more embodiments of the invention. In one or more embodiments of the invention, the second step classification may be performed if the input object is defined as particular type during the first step.

If a determination is made to perform the second step classification, then in Step 329, the second step classification is performed. In one or more embodiments of the invention, the second stage, second step classification may be performed by calculating the results of the decision functions defined during the second step classifier using another subset of measurements as input. In one or more embodiments of the invention, each decision function of the second step classifier is defined for a particular type. The type associated with the decision function having the greatest resulting value for the subset of measurements of the input object is the type associated with the input object during the second stage, second step classification. For example, the decision functions may be the decision functions discussed above with reference to Step 303 of FIG. 3A. In the example, the fisher linear discriminant may be calculated for the subset of measurements of the input object and then used in the decision functions to obtain f(x) for each type.

In one or more embodiments of the invention, the result of the second step classification replaces the result of the first step classification if the result of the second step classification indicates that the input object is a predefined type. For example, the predefined type may be a palm. If the second step classification indicates that the input object is a palm, then the second step classification is used rather than the result of the first step classification in accordance with one or more embodiments of the invention. If the result is not the predefined type, then the first step classification result is used in accordance with one or more embodiments of the invention. Other deterministic functions may be used to select whether to use the result of the first step classification or the second step classification without departing from the scope of the invention.

In Step 331, a classification result is determined. In one or more embodiments of the invention, the classification result includes a type and a confidence level. Any technique for calculating a confidence may be used without departing from the scope of the invention.

For example, the confidence level for the type in the first output may be the result of adding the value of the first stage decision function for the particular type to the value of the second stage decision function for the particular type. The second stage decision function is the either the first step decision function or the second step decision function depending on which type is used. In the example, if the first output is pointer instrument, then the value of the decision function used in the first stage classifier for pointer instrument is added to the value of the decision function used in the second stage classifier for pointer instrument to obtain a confidence level for pointer instrument. Similarly, if the first output is hovering palm, then the value of the decision function used in the first stage classifier for hovering palm is added to the value of the decision function used in the second stage classifier for hovering palm to obtain a confidence level for hovering palm. Similar to the above example for the first output, the confidence level may be calculated for the type identified in the second stage. In particular, the confidence level for the type in the second stage may be the result of adding the value of the first stage decision function for the type identified in the second stage to the value of the second stage decision function for the type in the second stage. Mathematically, calculating the confidence level may be performed using the equation $C_i = f_{i1}(x) + f_{i2}(x)$, where i is type i selected in either the first stage or second stage, $f_{i1}(x)$ is the result of decision function for type i calculated in the first stage, and $f_{i2}(x)$ is the result of decision function for type i calculated in the second stage.

The above is only an example technique for calculating confidence. Other techniques and equations may be used to calculate a confidence level in accordance with one or more embodiments of the invention.

In one or more embodiments of the invention, if the confidence level for the first stage is greater than the confidence level for the second stage, then the first output is used as the classification result. Otherwise, the second stage result is used as the classification result in accordance with one or more embodiments of the invention. Other rules may be applied for selecting whether to use the first stage classification result or the second stage classification result may be used without departing from the scope of the invention.

Although FIG. 3C describes only two stages and two steps in the second stage for the multistage classifier, more stages or a different number of steps may be used without departing from the scope of the invention. The additional stages or additional steps may be performed in similar manner to the stages and steps discussed above. Further, the additional stages and/or steps may use a different combination of measurements in accordance with one or more embodiments of the invention.

Figure 4:
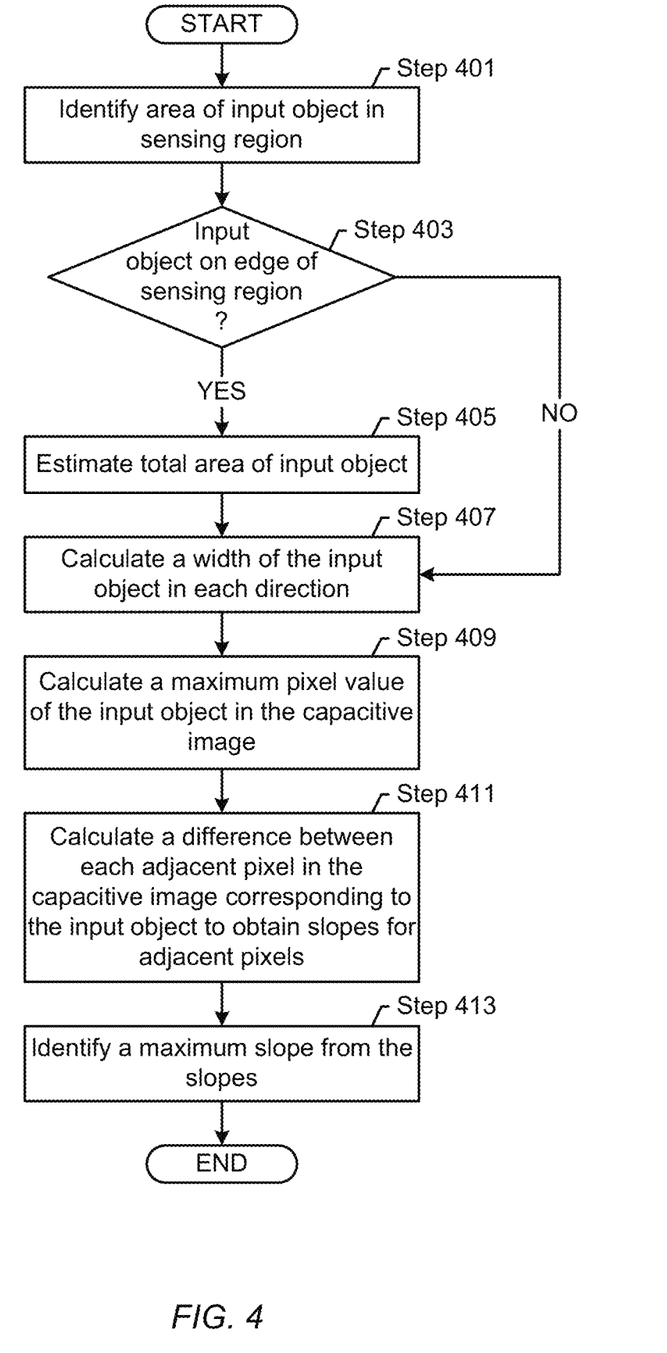

FIG. 4 shows a flowchart for obtaining measurements in accordance with one or more embodiments of the invention. Specifically, FIG. 4 shows an example flowchart for obtaining area, width, maximum pixel value and maximum slope in accordance with one or more embodiments of the invention. Other measurements may be calculated and used in one or more classifiers without departing from the scope of the invention.

In Step 401, the area of the input object in the sensing region is identified in accordance with one or more embodiments of the invention. In one or more embodiments of the invention, the area is determined as the number of pixels that are in the detection region. In one or more embodiments of the invention, determining whether a particular pixel is in the detection region may be based on whether the value of the particular pixel satisfies a threshold amount above a baseline value. Once a determination is made for each pixel, whether the pixel is in a detection region, the pixels that are in the detection region are counted and used as the area.

In Step 403, a determination is made whether the input object is on the edge of the sensing region. For example, the determination may be based on whether the edge pixels of the capacitive image are in the detection region. If the input object is at the edge of the sensing region, then area of the input object may expand passed the edge of the sensing region. If the input object is on the edge of the sensing region, the total area of the input object is estimated in Step 405. The total area may be estimated as a function of the values of the pixels in the detection region. For example, the function may be $$A = Ae + Ao = \frac{2a}{2a-b} Ao,$$

where A is total area, Ae is extended area, Ao is measured area, a is maximum value of a pixel in the detection region, and b is the maximum value of a pixel at the edge of the detection region. Other functions may be used to estimate total area in accordance with one or more embodiments of the invention.

In Step 407, the width of the input object in each direction is calculated in accordance with one or more embodiments of the invention. In one or more embodiments of the invention, the width of the input object may be calculated by counting the maximum number of pixels in the x direction in the detection region for the x direction width. Further, the maximum number of pixels in the y direction in the detection region may be calculated for the y direction width. Thus, if the detection region is narrow at one spot and wide at another spot, the width is the number of pixels at the wide spot.

Other techniques may be used to calculate the widths. For example, the widths may be the number of pixels in the particular direction that satisfies a threshold. For example, the threshold may be a scaling factor multiplied by the maximum value of a pixel in the particular direction.

In Step 409, a maximum pixel value of the input object in the capacitive image is calculated in accordance with one or more embodiments of the invention. Calculating the maximum pixel value includes determining the pixel value that has the largest value in the detection region. Further, the average value of the pixels in the detection region may be calculated by summing all values of pixels in the detection region and dividing by the measured area.

In Step 411, a difference between each adjacent pixel in the capacitive image corresponding to the input object is calculated to obtain slopes for adjacent pixels in accordance with one or more embodiments of the invention. In one or more embodiments of the invention, a separate slope is calculated for an x direction and for a y direction for each set of adjacent pixels.

In Step 413, the maximum slope is identified from the slopes calculated in Step 411 in accordance with one or more embodiments of the invention. In one or more embodiments of the invention, the maximum slope is the maximum value of the slopes calculated in the x direction and the y direction. Alternatively or additionally, a separate maximum slope for the x direction may be determined and a separate maximum slope for the y direction may be determined.

The above are only a few of the example measurements that may be determined for classification. Other measurements may be determined and used for the multistage classification in accordance with one or more embodiments of the invention.

Figure 5:
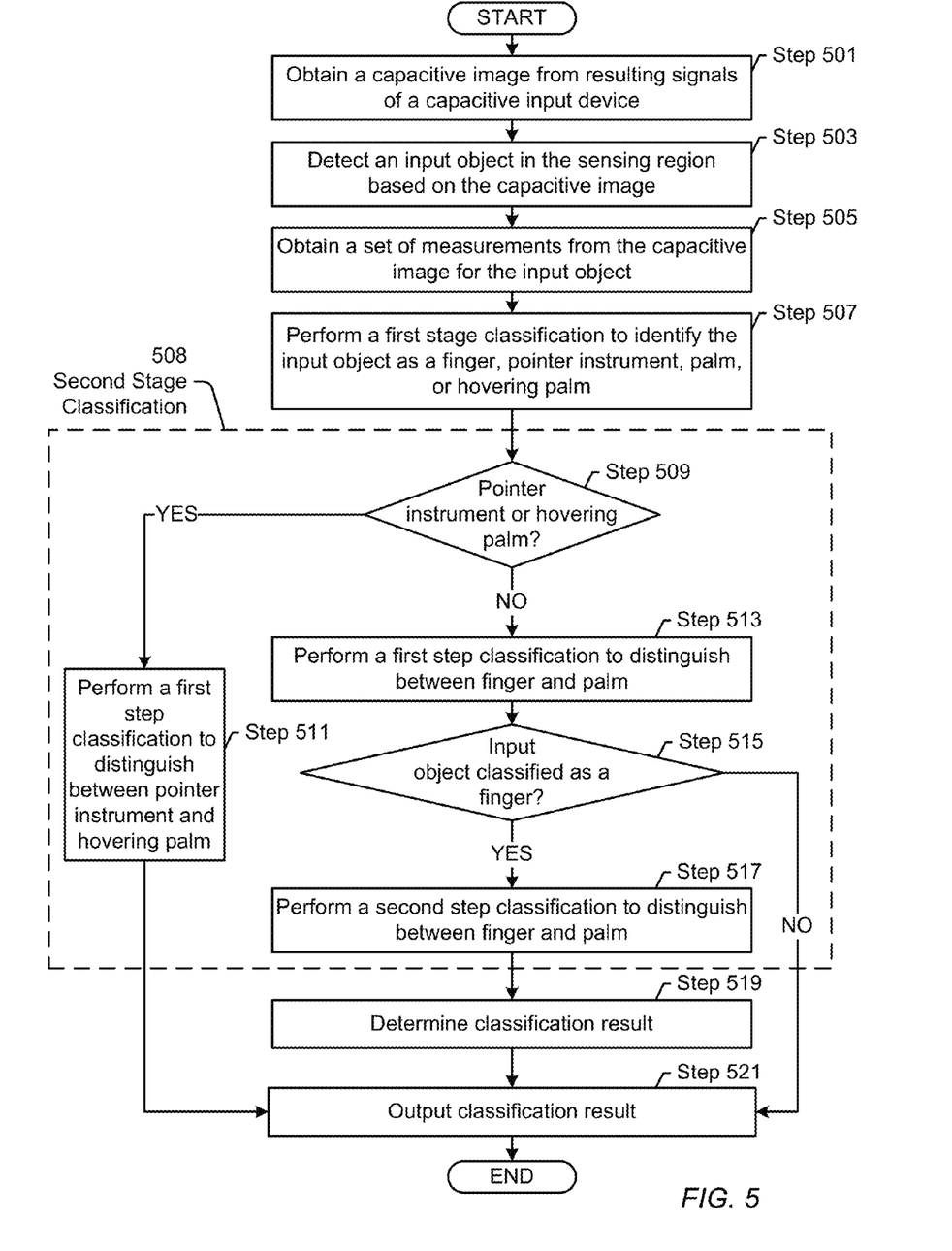

FIG. 5 shows a flowchart for distinguishing between whether the input object is a finger, pointer instrument, palm or hovering palm. The following example is for explanatory purposes only and not intended to limit the scope of the invention. In the following example, consider the scenario in which the classifiers use the corresponding decision functions discussed above and in Step 303 of FIG. 3A.

In Step 501, a capacitive image is obtained from resulting signals of a capacitive input device in accordance with one or more embodiments of the invention. In one or more embodiments of the invention, transmitter electrodes may transmit transmitter signals. The receiver electrodes may receive resulting signals comprising effects corresponding to the transmitter signals. From the resulting signals, a capacitive image is obtained.

In Step 503, an input object is detected in the sensing region using the capacitive image in accordance with one or more embodiments of the invention. Segmentation may be performed to isolate the input object from other input objects, if exists. Further, the capacitive image may be adjusted according to a baseline to account for interference. A change in the values of pixels in the capacitive image adjusted for the baseline may indicate a presence of input object in the sensing region.

In Step 505, a set of measurements are obtained from the capacitive image for the input object in accordance with one or more embodiments of the invention. In one or more embodiments of the invention, the set of measurements that are obtained may include the area of the detection region, the maximum slope of the detection region, and the average pixel value of the detection region. The measurements may be obtained using the techniques described above with reference to FIG. 4.

In Step 507, a first stage classification is performed to identify the input object as a finger, pointer instrument, palm, or hovering palm in accordance with one or more embodiments of the invention. In one or more embodiments of the invention, the first stage classification is performed using maximum slope and average pixel value as parameters. In particular, during training, a decision function may be defined for each of a finger, a pointer instrument, a palm, and a hovering palm. For example, the decision function may be of the form: $f(x)=ax_1^2+bx_1x_2+cx_2^2+dx_1+ex_2+f$, where $x_1$ is a maximum slope, $x_2$ is maximum pixel value of the input object, a, b, c, d, e, and f are parameters calculated using the training data during training and f(x) is a result of the decision function. In the example, the result of the decision function for finger, the result of the decision function for pointer instrument, the result of the decision function for palm, and the result of the decision function for hovering palm are all calculated using the maximum slope and average pixel value obtained in Step 505. The type corresponding to the result of the decision function with the greatest value is selected as the first output in accordance with one or more embodiments of the invention. Thus, in the example, if result of the decision function for finger is greater than the results of the decision functions for pointer instrument, palm, or hovering palm, then finger is selected as the first output.

In one or more embodiments of the invention, after the first stage classification, the flow may proceed to the second stage classification (508). In one or more embodiments of the invention, in Step 509 of the second stage classification, a determination is made whether the first output is that the input object is a pointer instrument or hovering palm in accordance with one or more embodiments of the invention.

In Step 511, if the first output indicates that the input object is a pointer instrument or hovering palm, than the second stage a first step classification is performed to distinguish between the pointer instrument and hovering palm. In one or more embodiments of the invention, the first step classification is performed using area as a parameter. In particular, during training, a decision function may be defined for a pointer instrument and a hovering palm. For example, the decision function of the form: $f(x)=ax_1^2+dx_1+f$, where x is area, a, d, and f are parameters identified during training, and f(x) is a classification result. In the example, the result of the decision function for pointer instrument and the result of the decision function for hovering palm are both calculated using the area obtained in Step 505. The type corresponding to the result of the decision function with the greatest value is selected as the second output in accordance with one or more embodiments of the invention. Thus, in the example, if result of the decision function for pointer instrument is greater than the result of the decision function for hovering palm, then pointer instrument is selected as the second output.

If the first output does not indicate that the input object is a pointer instrument or hovering palm, then the first step classification is performed to distinguish between a finger and a palm in Step 513. The first step classification to distinguish between finger and palm may be performed as discussed above with reference to Step 511, with the decision functions for finger and hovering palm used.

Continuing with the example FIG. 5, in Step 515, a determination is made whether the input object is classified as a finger in one or more embodiments of the invention. In Step 517, if the input object is classified as a finger, then a second step classification may be performed to distinguish between a finger and a palm. In one or more embodiments of the invention, the second step classification is performed using area and average pixel value as parameters. In particular, during training, a decision function may be defined for a finger and a decision function may be defined for a palm using the fisher linear discriminant as input. The decision functions may be of the form $f(x) = ax_1^2 + dx_1 + f$, where a, d, and f, are parameters and $x_1$ is the fisher linear discriminant. In the example, the dot product of the vector having the area and average pixel value and the vector w, obtained during training, is calculated to obtain the fisher linear discriminant for the input object detected in Step 503. In the example, the result of the decision function for finger and the result of the decision function for palm are both calculated. The type corresponding to the result of the decision function with the greatest value is selected.

If the result is palm, then palm is selected as the output for the second stage and the confidence level is calculated using the decision functions of the second step for the second stage. Further, an additional check may be performed to determine whether the input object is a palm based on the ratio of the width in the x direction ("wx") to the width in the y direction ("wy"). Specifically, if the maximum of wx divided by wy and wy divided by wx is greater than a threshold, the output of the second stage may be palm and confidence level may be set to a predetermined amount, such as zero. In one or more embodiments of the invention, if the result is not palm in the second step or the additional check or if the second step is not performed, then the prior result is used and the confidence level is calculated using the decision functions of the first step for the second stage.

In Step 519, the classification result is determined in accordance with one or more embodiments of the invention. In one or more embodiments of the invention, the classification result is determined by identifying the type in the first output ("type1") and the type in the second output ("type2"). The results of the decision functions for type1 in the first stage and the second stage are added together to obtain a first confidence level ("CL1"). Similarly, the results of the decision functions for type2 in the first stage and the second stage are multiplied together to obtain a second confidence level ("CL2"). In the example, if CL1 is greater than or equal to CL2, then type1 is in the classification result with a confidence level of CL1, otherwise type2 is in the classification result with a confidence level of CL2.

By way of a more concrete example, consider the scenario in which the first stage output is palm and the second stage output is finger. In the example, the result of the decision function for palm in the first stage is added to the result of the decision function for palm in the first step of the second stage to obtain CL1. Further, the result of the decision function for finger in the first stage is added to the result of the decision function for finger of the second stage to obtain CL2. If CL1 is greater than or equal to CL2, then palm is transmitted as output with a confidence level of CL1. Otherwise, finger is transmitted as output with a confidence level of CL2.

By way of another concrete example, consider the scenario in which the first stage output is pointer instrument and the second stage output is palm identified in the second step. In the example, the result of the decision function for pointer instrument in the first stage is added to the result of the decision function for pointer instrument in the second step of the second stage to obtain CL1. Further, the result of the decision function for palm in the first stage is added to the result of the decision function for palm in the second step of the second stage to obtain CL2. If CL1 is greater than or equal to CL2, then pointer instrument is transmitted as output with a confidence level of CL1. Otherwise, palm is transmitted as output with a confidence level of CL2.

Continuing with the example FIG. 5, in Step 521, the classification result is transmitted as output in accordance with one or more embodiments of the invention. For example, the input device may transmit the classification result to a host or other module of the processing system, which determines based on the confidence level and type whether and/or how to respond to the input object in the sensing region. In various embodiments, the classification result may be combined with output data from other sensing devices, and a determination may be based on the combined data.

FIG. 5 and the corresponding description are only for explanatory example purposes. Other decision functions, types, calculations, and other features than those presented in FIG. 5 and corresponding description may be used without departing from the scope of the invention.

Further, although the above description and claims use ordinal numbers, no ordering intended to be expressly or implicitly required in either the description or the claims. Rather, the use of first, second, third, and so forth before an element is merely to indicate that the elements are different. Thus, a second may precede a first without departing from the scope of the invention or the claims unless expressly indicated to the contrary.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device comprising:
a sensor module comprising sensor circuitry configured to be coupled to a plurality of transmitter electrodes and a plurality of receiver electrodes, wherein the sensor module is configured to transmit transmitter signals with the plurality of transmitter electrodes and receive resulting signals with the plurality of receiver electrodes; and
a determination module configured to:
obtain a set of measurements for an input object detected in a sensing region of the input device from a capacitive image, wherein the capacitive image is generated based on the resulting signals, and perform, based on the set of measurements, a multistage classification to obtain a classification result identifying a type of the input object, wherein the multistage classification comprises:
a first classification using a first subset of the set of measurements to obtain a first output,
wherein the first classification selects, as the first output, a single subset of types from a first subset of types and a second subset of types, the first subset of types being disjoint from the second subset of types,
wherein the first subset of types comprises a finger and a palm,
wherein the second subset of types comprises a pointer instrument and a hovering palm, and
wherein the first subset of the set of measurements comprises a maximum slope, wherein the maximum slope is a maximum difference in value between adjacent pixels in the input object as represented in the capacitive image; and
a second classification using a second subset of the set of measurements, wherein the second classification comprises:
a first step performed based on the first output to obtain a second output, and
a second step performed based on the second output, wherein the second step comprises:
calculating a set of results of a plurality of decision functions using an average pixel value of the input object, the plurality of decision functions defined for each type in the single subset of types, and
selecting an optimal result from the set of results,
wherein the multistage classification distinguishes between each of a plurality of types comprising the pointer instrument, the hovering palm, the palm, and the finger, and
wherein the type of the input object is at least one of the plurality of types.

2. The processing system of claim 1, wherein the second step is performed only when the second output is the finger.

3. The processing system of claim 1, wherein the first subset of the set of measurements is different than the second subset of the set of measurements.

4. The processing system of claim 1, wherein the first subset of the set of measurements further comprises a maximum pixel value of the input object as represented in the capacitive image.

5. The processing system of claim 1, wherein the second subset of the set of measurements comprises an area of the input object and width.

6. The processing system of claim 1, wherein the first step comprises a Bayesian analysis of area of the input object, and the second step comprises:
obtaining a fisher linear discriminant of area and average pixel value, and
performing a Bayesian analysis of the fisher linear discriminant.

7. The processing system of claim 1, wherein the classification result further comprises a confidence level.

8. A method for classifying a type of input object, the method comprising:
obtaining a set of measurements for an input object detected in a sensing region of the input device from a capacitive image, wherein the capacitive image is generated based on resulting signals obtained by a sensor module; and
performing, based on the set of measurements, a multistage classification to obtain a classification result identifying the type of the input object, wherein performing the multistage classification comprises:
classifying the input object into a single subset of types using a first subset of the set of measurements,
wherein the single subset of types is selected from a first subset of types and a second subset of types, the first subset of types being disjoint from the second subset of types,
wherein the first subset of types comprises a finger and a palm,
wherein the second subset of types comprises a pointer instrument and a hovering palm, and
wherein the first subset of the set of measurements comprises a maximum slope, wherein the maximum slope is a maximum difference in value between adjacent pixels in the input object as represented in the capacitive image; and
classifying the input object to identify the type using a second subset of the set of measurements, wherein classifying the input object to identify the type comprises:
performing a first step based on the single subset of types to obtain an output, and
performing a second step based on the output, wherein the second step comprises:
calculating a set of results of a plurality of decision functions using an average pixel value of the input object, the plurality of decision functions defined for each type in the single subset of types, and
selecting an optimal result from the set of results,
wherein the multistage classification distinguishes between each of a plurality of types comprising the pointer instrument, the hovering palm, the palm, and the finger, and
wherein the type of input object is at least one of the plurality of types.

9. The method of claim 8, wherein the first subset of the set of measurements are different than the second subset of the set of measurements.

10. The method of claim 8, wherein the first subset of the set of measurements further comprises a maximum pixel value of the input object as represented in the capacitive image.

11. The method of claim 8, wherein the second subset of the set of measurements comprises an area of the input object and width.

12. The method of claim 8, wherein the second step is performed only when the second output is the finger.

13. The method of claim 8, wherein the first step comprises a Bayesian analysis of area of the input object, and the second step comprises:
obtaining a fisher linear discriminant of area and average pixel value, and
performing a Bayesian analysis of the fisher linear discriminant.

14. The method of claim 8, wherein the classification result further comprises a confidence level.

15. An input device comprising:
a plurality of transmitter electrodes configured to transmit transmitter signals;
a plurality of receiver electrodes configured to receive resulting signals from the plurality of transmitter signals; and a processing system configured to:
  obtain a set of measurements for an input object detected in a sensing region of the input device from a capacitive image, wherein the capacitive image is generated based on the resulting signals, and
  perform, based on the set of measurements, a multistage classification to obtain a classification result identifying a type of the input object, wherein the multistage classification comprises:
    a first classification using a first subset of the set of measurements to obtain a first output,
      wherein the first classification selects, as the first output, a single subset of types from a first subset of types and a second subset of types, the first subset of types being disjoint from the second subset of types,
      wherein the first subset of types comprises a finger and a palm,
      wherein the second subset of types comprises a pointer instrument and a hovering palm, and
      wherein the first subset of the set of measurements comprises a maximum slope, wherein the maximum slope is a maximum difference in value between adjacent pixels in the input object as represented in the capacitive image; and
    a second classification using a second subset of the set of measurements, wherein the second classification comprises:
      a first step performed based on the first output to obtain a second output, and
      a second step performed based on the second output, wherein the second step comprises:
        calculating a set of results of a plurality of decision functions using an average pixel value of the input object, the plurality of decision functions defined for each type in the single subset of types, and
        selecting an optimal result from the set of results,
      wherein the multistage classification distinguishes between each of a plurality of types comprising the pointer instrument, the hovering palm, the palm, and the finger, and
      wherein the type of input object is at least one of the plurality of types.

16. The input device of claim 15, wherein the second step is performed only when the second output is the finger.

17. The input device of claim 15, wherein the first subset of the set of measurements further comprises a maximum pixel value of the input object as represented in the capacitive image.

18. The input device of claim 15, wherein the second subset of the set of measurements comprises an area of the input object and width.

19. The input device of claim 15, wherein the first step comprises a Bayesian analysis of area of the input object, and the second step comprises:
  obtaining a fisher linear discriminant of area and average pixel value, and
  performing a Bayesian analysis of the fisher linear discriminant.

20. The input device of claim 15, wherein the classification result further comprises a confidence level.

* * * * *